March 25, 1958 — K. L. MORTON — 2,828,465
APPARATUS FOR TESTING CONTACTS
Filed Oct. 23, 1952
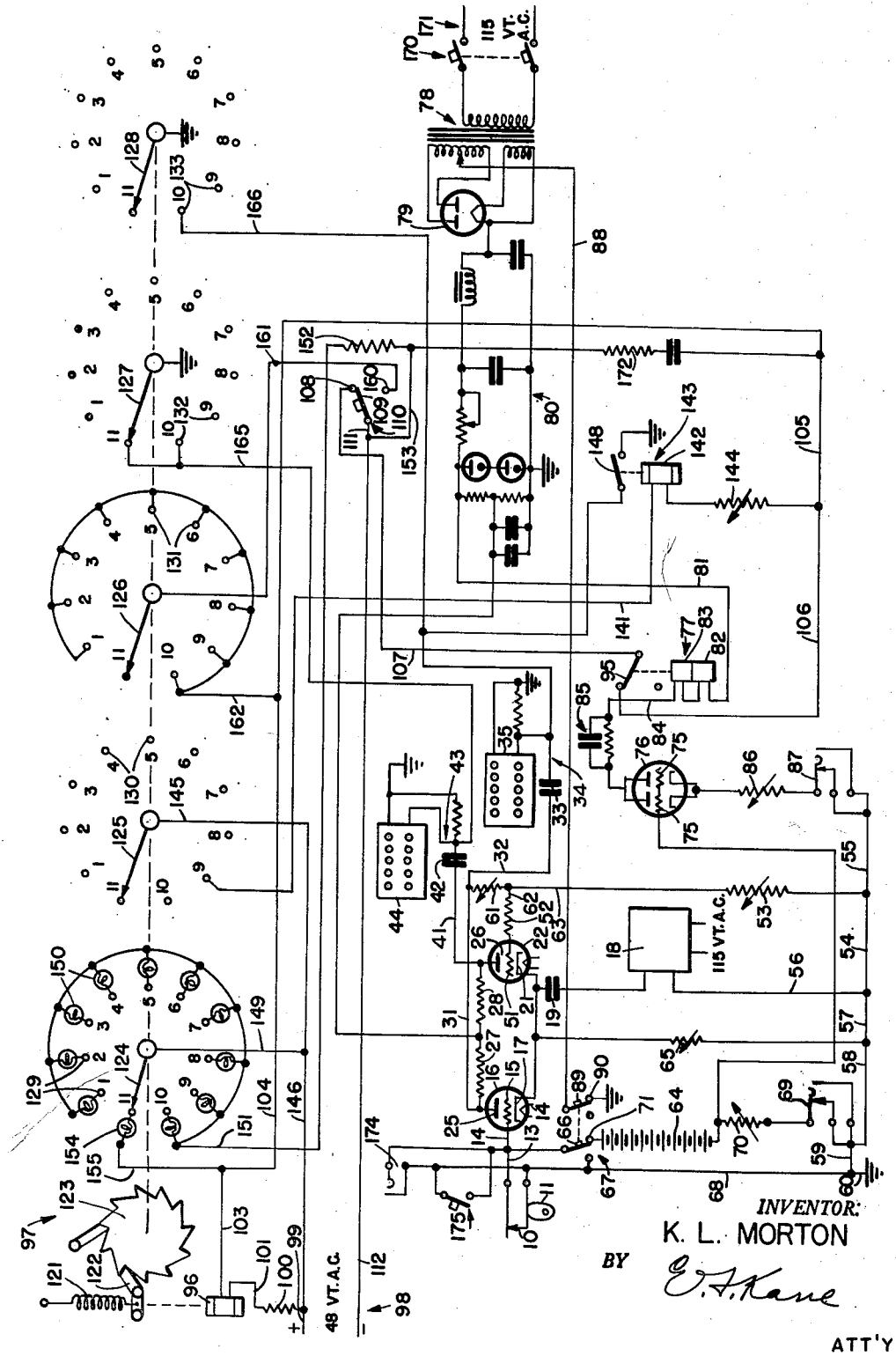
INVENTOR:
K. L. MORTON
BY
ATT'Y United States Patent Office 2,828,465
Patented Mar. 25, 1958

2,828,465

APPARATUS FOR TESTING CONTACTS

Kenneth L. Morton, Indianapolis, Ind., assignor to Western Electric Company, Incorporated, New York, N. Y., a corporation of New York Application October 23, 1952, Serial No. 316,531

8 Claims. (Cl. 324—28)

This invention relates to apparatus for testing articles, and more particularly to apparatus for measuring the periods of time in which intermittently actuated electrical contacts are open and the periods of time the contacts are closed.

An object of the invention is to provide new and improved apparatus for testing articles.

Another object of the invention is to provide new and improved apparatus for measuring the periods of time in which intermittently actuated electrical contacts are open and the periods of time the contacts are closed.

A further object of the invention is to provide apparatus for measuring the total time intermittently operated electrical contacts are fully closed and separately measuring the total time the contacts are fully open.

An apparatus illustrating certain features of the invention may serve to connect a source of high frequency current to one counter responsive to the frequency of the current when an article being tested is in one condition and connect the source to a second counter when the article is in a second condition.

An apparatus illustrating a more specific embodiment of the invention may include a pair of vacuum tubes connected to a high frequency oscillator. A counter responsive to the frequency of electric current supplied thereto is connected in the plate circuit of one of the tubes, and a second, similar counter is connected in the plate circuit of the other tube. Means are provided for connecting contacts to be tested to the control grid of one of the tubes to fire that tube when the contacts are fully open, and an adjustable attenuator connects the plate of the last-mentioned tube to the control grid of the other tube to fire the latter tube when the contacts are fully closed. Thus, one of the counters is actuated when the contacts are fully closed, and the other counter is actuated when the contacts are fully open. A stepping relay may be provided for stopping the actuation of the counters when the contacts have been opened and closed a predetermined number of times.

A complete understanding of the invention may be obtained from the following detailed description of an apparatus forming a specific embodiment thereof, when read in conjunction with the appended drawing, in which the single figure shows an apparatus forming a specific embodiment of the invention.

Referring now in detail to the drawing, there is shown therein a testing circuit for measuring very accurately the total time a spring contact 10 is fully closed and the total time the contact 10 is fully open as the contact 10 is periodically closed and permitted to open by a cam 11. Assuming the contact 10 and the cam 11 are part of a dialing mechanism, the cam 11 is rotated ten revolutions for the test, starting with the contacts 10 closed and ending with the contacts closed, the contacts being closed eleven times and opened ten times. One side of the contacts 10 is connected by conductors 13 and 14 to a control grid 15 of a vacuum tube 16 having a cathode 17 connected to an oscillator 18 of a suitable predetermined, known frequency, for example, a frequency in the order of 1000 cycles per second, through a condenser 19. A cathode 21 of a vacuum tube 22 is connected to the condenser 19 and the oscillator 18 in parallel with the cathode 17. Plates 25 and 26 of the tubes 16 and 22, respectively, are connected together by equal resistors 27 and 28. Conductors 31 and 32 connect the plate 25 to a condenser 33 of a resistance-capacitance network 34 connected to a counter 35 responsive to oscillating current for counting break, or open, time of the contact 10. A conductor 41 connects the plate 26 to a condenser 42 of a resistance-capacitance network 43 connected to a counter 44 for counting make, or closed, time of the contact 10. The counters 35 and 44 are commercially available, and count each electrical oscillation. The counters totalize the oscillations transmitted thereto even though there be interruptions in the transmission of the oscillations thereto. That is, the counters will totalize the sum of the oscillations occurring between interruptions in the transmission of the oscillations to the counters. Suitable counters for use as the counters 35 and 44 are Electronic Counter Model 340 made by the Potter Instrument Company, Incorporated, of Great Neck, New York.

A control grid 51 of the tube 22 is connected by a resistor 52 and a variable resistor 53 to conductors 54 and 55, and a conductor 56 connects one side of the oscillator 18 to the conductor 54 and through conductors 57, 58, 59 and 60 to ground. A resistor 61 connects the conductor 31 to conductors 62 and 63 connecting the resistor 52 to the variable resistor 53. The resistor 61 is set at such a value relative to the settings of the variable resistor 53 and a variable resistor 65 connecting the cathodes 17 and 21 to the conductors 54 and 57 that, only when the contacts 10 are fully closed, current from a battery 64 flowing through contacts 71 and 66 of a manually operable switch 67, the contacts 10, a conductor 68, the conductor 59, a jack 69 and an adjustable resistor 70 reduces the potential on the grid 15 sufficiently to substantially stop pulsing or oscillating current flow through the tube 16. This raises the plate potential of the tube 16 sufficiently to raise the potential of the grid 51 of the tube 22 to make the tube 22 conductive, whereby current from the oscillator 18 actuates the make counter 44.

As the contacts 10 start to open, the potential on the grid 15 of the tube 16 instantly raises an amount such as to increase the plate current of the tube 16 to drop the potential of the grid 51 sufficiently to reduce the plate current of the tube 22 to an extent that actuation of the make counter 44 is stopped. However, the potential of the grid 15 is not sufficiently high to permit sufficient current through the tube 16 to actuate the counter 35 until no current flows through the contacts 10. When the contacts 10 are fully open, the plate current of the tube 16 actuates the break counter 35 and continues to do so until current again starts to flow through the contacts 10.

When the contacts 10 are closed, the potential drops on control grids 75 of a tube 76 connected to the negative side of the battery 64 to stop the plate current of the tube 76. This stops current flow through a relay 77 from a transformer 78, a rectifier tube 79, a filter 80, a conductor 81, aiding windings 82 and 83 of the relay 77, a conductor 84, a resistance-capacitance network 85, the tube 76, an adjustable resistor 86 and a test jack 87 to the grounded conductor 60, the center of the secondary winding of the transformer 78 being connected to ground through a conductor 88 and contacts 89 and 90 of the switch 67. This deenergizes the relay windings 82 and 83 to close contacts 95 thereof.

This energizes a winding 96 of a stepping selector relay 97 from a powerline 98 through a conductor 99, a resistor 100, a conductor 101, the winding 96, conductors 103, 104, 105 and 106, the contacts 95, a conductor 107, contacts 108 and 109 of a reset switch 110 and conductors 111 and 112. When the winding 96 of the stepping selector relay 97 is deenergized, a spring 121 actuates an armature pawl 122 to move a ratchet wheel 123 one step in a clockwise direction to turn contactors 124, 125, 126, 127 and 128 clockwise from engagement with one contact each of banks of numbered contacts 129, 130, 131, 132 and 133, respectively, to engagement with the next one of these contacts. Each time the relay winding 96 is energized, it merly cocks the pawl 122, the pawl turning the ratchet only when the relay winding 96 is deenergized.

The number 9 contact of the bank of contacts 130 is connected by a conductor 141 to a winding 142 of a slow-to-release relay 143 connected to the conductor 112 of the powerline 98 through an adjustable resistor 144, the contacts 95 of the relay 77, the contacts 108 and 109 of the reset switch 110 and the conductor 111. When the contactor 125, which is connected to the conductor 99 by conductors 145 and 146, contacts the number 9 contact 130 and the contacts 95 are closed, the relay winding 142 is energized and makes contacts 148 to shunt the break counter 35.

The contactor 124 connected by a conductor 149 to the conductor 146 engages sequentially the contacts 129 as the relay 97 steps to sequentially light lamps 150 connected to the contacts 129 and to a conductor 151 connected through a resistor 152 and a conductor 153 to the other side of the powerline 98. When the contactor 124 contacts the number 11 contact 129, which is the starting and stopping contact, it connects a lamp 154 to the powerline 98 through conductors 146 and 149, the contactor 124, the number 11 contact 129, the lamp 154, conductors 155, 104, 105 and 106, the contacts 95 and the conductor 107, the contacts 108 and 109 and the conductor 111 to light the lamp 154, which indicates that the relay 97 is in its starting condition.

When the contact 109 of the reset switch 110 is momentarily moved out of engagement with the contact 108 and into engagement with a contact 160 while the contactor 126 is in engagement with any but the number 11 contact of the contacts 131, a conductor 161 connects the contactor 126 to the powerline conductor 112 and a conductor 162 connects the conductor 104 to the engaged contact 131 to energize the relay winding 96. Then release of the reset switch causes the relay 97 to deenergize and step one position. This may be repeated until the relay 97 reaches its starting condition.

Number 10 and 11 contacts 132 are connected by a conductor 165 to the network 43 so as to shunt out the make counter 44 when the contactor 127 engages either of these contacts, the contactor 127 being grounded. Similarly, the contactor 128, which is grounded, and the number 10 contact 133 connected by a conductor 166 to the network 34 shunt the break counter 35 to prevent operation of this counter when the contactor 128 contacts the number 10 contact 133. A switch 170 is provided in a powerline 171 supplying power to the transformer 78, and the resistance 152 is connected by a resistance-capacitance network 172, which protects the contacts 95 from inductive surges of the relay winding 96. A test jack 174 and a manually operable shunting switch 175 are connected in parallel with the contacts 10.

*Operation*

With the relay 97 in its starting condition with the contactors 124, 125, 126, 127 and 128 in the number 11 position, the contacts 10 closed, the contacts 66 and 89 of the switch 71 in engagement with the contacts 65 and 90, respectively, and the switch 170 closed, the cam 11 is rotated ten revolutions. At this time the counter 44 is shunted by the contactor 127 so that it is not actuated. Then, as the contacts 10 start to open, the relay 77 is energized to open contacts 95, which deenergizes the stepping relay winding 96, and the contactors 124, 125, 126, 127 and 128 are moved out of engagement with the number 11 contacts and into engagement with the number 1 contacts. Meanwhile, the counter 35 is actuated immediately when, during a portion of each revolution of the cam 11, the current stops flowing through the contacts 10 which causes an actuating flow of current from the oscillator 18 through the tube 16 to the counter 35.

Some time after the relay 97 has stepped, the cam 11 closes the contacts 10, which, when fully closed, reduce the potential of the grid 15 to stop the actuating current flow through the tube 16. This simultaneously raises the potential of the plate 25 sufficiently to raise the potential of the grid 51 of the tube 22 enough to cause the current from the oscillator 18 to flow through the tube 22 to the make counter 44 in actuating quantity, which, since the contactor 127 is out of engagement with the number 11 contact 132, is actuated and totalizes the number of oscillations coming thereto. As the contacts 10 are closed, the potential of the grids 75 is lowered to cause deenergization of the relay windings 82 and 83 to close contacts 95 to energize the stepping relay winding 96 to cock the relay 97. Then, while the contacts 10 are being opened again, the relay windings 82, 83 are energized, and the relay winding 96 is deenergized and the relay 96 steps one position. Thus, the relay 96 steps one position for each revolution of the cam 11.

The alternate measuring on the counters 44 and 35 of the periods of time the contacts 10 are fully closed and fully open, respectively, continues in this manner until the contacts 10 are opened the tenth time. However, as the contacts 10 are opened the ninth time, the contactor 125 moves into engagement with the number 9 contact 130 to connect the powerline conductor 99 to the relay winding 142, and when the contacts 10 next close to drop out the relay 77 to close the contacts 95 to connect the relay winding 142 to the other powerline conductor 112, the relay 143 then closes the contacts 148. The measurement of this time, the tenth, the contacts 10 are closed is made on the make counter 44. Then, as the contacts 10 are opened the relay 77 is energized to deenergize the relays 97 and 143. Since the relay 143 is slow to release, the contacts 148 remain closed to shunt the counter 35 during the tenth break of the contacts 10 so that it is not actuated. The slow-to-release relay 142 keeps the contacts 148 closed until the relay 97 has stepped from the number 9 position to the number 10 position, in which latter position the contactor 128 and the number 10 contact 133 short out or shunt the break counter 35 so that the counter 35 is not actuated further. When the step relay 97 moves the contactors from the number 10 contacts to the number 11 contacts, the contactor 127 has bridging contacts or make before break contacts. Therefore, when the contactor 127 moves from the number 10 position to the number 11 position, the counter 44 is shunted, thereby preventing its operation. As the contactor 128 moves from its number 10 position to its number 11 position, the shunt is removed from the counter 35, but since the contacts 10 are closed no signal is applied to the counter 35. The dialing mechanism does not open the contacts 10 again after the stepping relay contactors reach their number 10 positions, as is inherent in telephone dials, and the dialing mechanism may be disconnected from the circuit. The stepping relay contactors then are moved from their number 10 positions and their number 11 positions by pushing the reset switch 110 to prepare the circuit to test another dialing mechanism, the switch 67 being opened manually and not closed until the next dialing mechanism is connected to the circuit and is wound to its starting condition in which the contacts 10 are closed and the dialing mechanism is set to open the contacts ten times and close them ten times. While the contacts 10 are closed and the contactors of the stepping relay are in their number 10 and 11 positions, the contactor 127 shorts out the make counter 44. Thus, precisely nine makes and nine breaks of the contacts 10 are measured on the counters 44 and 45 for one complete revolution of the stepping relay 97, which automatically stops in the number 11 position because the cam 11 stops its rotation.

The above-described apparatus serves to accurately measure the total time the contacts 10 are fully closed and also the total time these contacts are fully open over a series of opening and closing movements. The oscillator 18 may be set to deliver a 10 kc. current, the counters are accurate to 0.0001 second for each period of actuation, and the apparatus is very precise in its measurements. The oscillator also may be set to deliver 100 kc. to further the precision. The counters 35 and 44 are of a totalizing type and also may be reset to zero manually whenever desired.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing articles, which comprises a counter for counting current oscillations, a second counter for counting current oscillations, a continuously operable source of alternating current of a predetermined frequency, electronic gating means responsive to closure of contacts being tested while opened and closed periodically for connecting the current source to the first counter while the contacts are closed, and electronic gating means responsive to opening of the contacts for connecting the current source to the second counter while the contacts are open.

2. An apparatus for testing articles, which comprises a make counter for counting current oscillations, a break counter for counting current oscillations, a continuously operable source of alternating current of a predetermined frequency, electronic gating means for connecting the current source to the make counter while contacts which are opened and closed periodically while being tested are closed, electronic gating means for connecting the current source to the break counter while the contacts are open, and means for preventing the operation of the connecting means while the contacts are being opened and while the contacts are being closed.

3. An apparatus for testing articles, which comprises a make counter for counting current oscillations, a break counter for counting current oscillations, a source of alternating current of a predetermined frequency, a vacuum tube provided with a control grid and having its plate circuit connected in series with the make counter and the current source, a second vacuum tube provided with a control grid and having its plate circuit connected in series with the break counter and the current source, biasing means connecting the control grid of the second tube to contacts being opened and closed periodically to actuate that tube only when the contacts are fully open, and biasing means connecting the plate circuit of the second tube to the control grid of the first-mentioned tube and being of such a value as to actuate the first-mentioned tube only when the contacts are fully closed.

4. An apparatus for testing articles, which comprises a make counter for counting current oscillations, a break counter for counting current oscillations, a source of alternating current of a predetermined frequency, an electronic tube provided with a control grid and having its plate circuit connected in series with the make counter and the current source, a second electronic tube provided with a control grid and having its plate circuit connected in series with the break counter and the current source, a second source of current connecting the control grid of one of the tubes to contacts under test being opened and closed periodically to actuate that tube only when the contacts are fully open or closed, and biasing means connecting the plate circuit of the last-mentioned tube to the control grid of the other tube and being of such a value as to actuate the last-mentioned tube only when the other tube is not actuated.

5. An apparatus for testing articles, which comprises a make counter for counting current oscillations, a break counter for counting current oscillations, a source of alternating current of a predetermined frequency, a circuit including an electronic tube provided with a control grid and having its plate circuit connected in series with the make counter and the current source, a second circuit including a second electronic tube provided with a control grid and having its plate circuit connected in series with the break counter and the current source, a second source of current connecting the control grid of the first-mentioned tube to contacts under test being opened and closed periodically to actuate that tube only when the contacts are fully closed, biasing means connecting the plate circuit of the first-mentioned tube to the control grid of the second tube and being of such a value as to actuate the second tube only when the contacts opened sufficiently that no arcing therebetween occurs, means for preventing actuation of the make counter at the start of a test until the beginning of a period of closure of the contacts, means for preventing the actuation of the break counter at the start of a test until the beginning of a period of opening of the contacts, and means for preventing the actuation of the counters after the contacts have been opened and closed a predetermined number of times.

6. An apparatus for measuring the make time and the break time of contacts of a dialing mechanism which opens and closes the contacts a predetermined number of times, which comprises a totalizing counter responsive to alternating current for counting oscillations of the current, a second totalizing counter responsive to alternating current for counting oscillations of the current, a circuit connected to the contacts for supplying current thereto, an electronic tube circuit including a continuously operable oscillator, said electronic tube circuit being responsive to full closure of the contacts for connecting the oscillator to one of the counters while the contacts are fully closed, and a second electronic tube circuit responsive to full opening of the contacts for connecting the oscillator to the second counter.

7. An apparatus for measuring the make time and the break time of contacts of a dialing mechanism which opens and closes the contacts a predetermined number of times, which comprises a totalizing counter responsive to alternating current for counting oscillations of the current, a second totalizing counter responsive to alternating current for counting oscillations of the current, a circuit connected to the contacts of the dialing mechanism for supplying current thereto, an electronic tube circuit including an oscillator responsive to full opening of the contacts for supplying alternating current of a predetermined frequency to the first counter while the contacts are fully open, a second electronic tube circuit including the oscillator and biasing means connected to the plate circuit of the first tube circuit responsive to full closure of the contacts for supplying alternating current of said frequency to the second counter, a counting switch including a plurality of banks of contacts, a plurality of contactors for sequentially engaging the contacts of the banks and stepping relay means for moving the contactors when deenergized after being energized, relay means responsive to the dialing mechanism contacts for deenergizing the stepping relay means when the dialing mechanism contacts are opened and energizing the stepping relay means when the dialing mechanism contacts are closed, a circuit including one of the contactors of one of the banks thereof for shunting one of the counters after the stepping relay means has been actuated a predetermined number of times, and a circuit including one of the contacts of another of the banks thereof for shunting the other counter after the stepping relay means has been actuated a predetermined number of times.

8. An apparatus for measuring the make time and the break time of contacts of a dialing mechanism which opens and closes the contacts a predetermined number of times, which comprises a totalizing counter responsive to alternating current for counting oscillations of the current, a second totalizing counter responsive to alternating current for counting oscillations of the current, a circuit connected to the contacts of the dialing mechanism for supplying current thereto, an electronic tube circuit including an oscillator responsive to full opening of the contacts for supplying alternating current of a predetermined frequency to the first counter while the contacts are fully open, a second electronic tube circuit including the oscillator and biasing means connected to the plate circuit of the first vacuum tube circuit responsive to full closure of the contacts for supplying alternating current of said frequency to the second counter, a counting switch including a plurality of banks of contacts, a plurality of contactors for sequentially engaging the contacts of the banks and stepping relay means for moving the contactors when deenergized after being energized, relay means responsive to the dialing mechanism contacts for deenergizing the stepping relay means when the dialing mechanism contacts are opened and energizing the stepping relay means when the dialing mechanism contacts are closed, a circuit including one of the contactors of one of the banks thereof for shunting one of the counters after the stepping relay means has been actuated a predetermined number of times, a circuit including one of the contacts of another of the banks thereof for shunting the other counter after the stepping relay means has been actuated a predetermined number of times, and a circuit including another contact of one of said last-mentioned banks for shunting the counter associated with that bank of contacts at the start of a test of the dialing mechanism.

References Cited in the file of this patent

UNITED STATES PATENTS

| | | |
|---|---|---|
| 1,127,466 | McBerty | Feb. 9, 1915 |
| 1,577,046 | Miller | Mar. 16, 1926 |
| 2,184,843 | Kramar | Dec. 26, 1939 |
| 2,277,579 | Burger et al. | Mar. 24, 1942 |
| 2,407,320 | Miller | Sept. 10, 1946 |
| 2,472,542 | Moerman | June 7, 1949 |
| 2,539,673 | Peterson | Jan. 30, 1951 |
| 2,599,766 | Linsley | June 10, 1952 |
| 2,638,273 | Jensen et al. | May 12, 1953 |